US012720436B2

(12) United States Patent
Chen et al.

(10) Patent No.: US 12,720,436 B2
(45) Date of Patent: Aug. 25, 2026

(54) USER EQUIPMENT, METHOD OF USER EQUIPMENT, NETWORK NODE, AND METHOD OF NETWORK NODE

(71) Applicant: NEC Corporation, Tokyo (JP)

(72) Inventors: Yuhua Chen, London (GB); Caroline Liang, Guildford (GB); Neeraj Gupta, London (GB)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 18/291,609

(22) PCT Filed: Jul. 29, 2022

(86) PCT No.: PCT/JP2022/029235
§ 371 (c)(1),
(2) Date: Jan. 24, 2024

(87) PCT Pub. No.: WO2023/013531
PCT Pub. Date: Feb. 9, 2023

(65) Prior Publication Data

US 2024/0373363 A1 Nov. 7, 2024

(30) Foreign Application Priority Data

Aug. 4, 2021 (GB) ..................................... 2111281

(51) Int. Cl.
*H04W 76/28* (2018.01)
*H04W 52/02* (2009.01)
*H04W 84/06* (2009.01)

(52) U.S. Cl.
CPC ........ *H04W 52/0251* (2013.01); *H04W 84/06* (2013.01)

(58) Field of Classification Search
CPC ......... H04W 52/0219; H04W 52/0029; H04W 52/0251; H04W 52/0235; H04W 52/0216; H04W 52/028; H04B 7/1851
See application file for complete search history.

(56) References Cited

U.S. PATENT DOCUMENTS

2004/0235537 A1 11/2004 Koga et al.
2024/0032097 A1* 1/2024 Hoppe .................. H04W 74/04
2025/0097845 A1* 3/2025 Lin ................... H04W 52/0235

FOREIGN PATENT DOCUMENTS

EP 3799331 A1 3/2021

OTHER PUBLICATIONS

International Search Report for PCT Application No. PCT/JP2022/029235, mailed on Dec. 19, 2022.
GB Search Report for GB Application No. 2111281.8, dated on Feb. 1, 2022.
3GPP, "3GPP TR 36.763 V17.0.0 (Jun. 2021)", pp. 1-73.
3GPP, "3GPP TR 38.811 V15.4.0 (Sep. 2020)", pp. 1-127.
3GPP, "3GPP TR 38.821 V16.1.0 (May 2021)", pp. 1-140.
3GPP, "3GPP TS 38.300 V16.6.0 (Jun. 2021)", pp. 1-152.
(Continued)

*Primary Examiner* — Anez C Ebrahim

(57) ABSTRACT

A method of a user equipment (UE) for communicating via a non-terrestrial network is disclosed. The method comprises determining whether the UE is in coverage of the non-terrestrial network or out-of-coverage of the non-terrestrial network and initiating a procedure for power saving of the UE, based on the determining.

9 Claims, 12 Drawing Sheets

(56) References Cited

OTHER PUBLICATIONS

3GPP, “3GPP TS 37.340 V16.6.0 (Jun. 2021)”, pp. 1-88.
Huawei et al, “Discussion on mobility enhancement for IoT NTN”, R2-2105663, May 10, 2021, pp. 1-6.
Mediatek Inc, “Time and frequency synchronization Enhancements in IoT NTN”, R1-2104568, May 11, 2021, pp. 1-9.
Lenovo et al: “Considerations on power saving for idle mode in discontinuous Coverage”, R2-2105821, May 11, 2021, pp. 1-3.

* cited by examiner architecture option 1 architecture option 2 architecture option 3 architecture option 4

USER EQUIPMENT, METHOD OF USER EQUIPMENT, NETWORK NODE, AND METHOD OF NETWORK NODE

This application is a National Stage Entry of PCT/JP2022/029235 filed on Jul. 29, 2022, which claims priority from GB Patent Application 2111281.8 filed on Aug. 4, 2021, the contents of all of which are incorporated herein by reference, in their entirety.

TECHNICAL FIELD

The present invention relates to a wireless communication system and devices thereof operating according to the 3rd Generation Partnership Project (3GPP) standards or equivalents or derivatives thereof. The disclosure has particular but not exclusive relevance to improvements relating to power saving enhancements for Internet-of-Things (IoT) devices in the so-called Long Term Evolution (LTE) systems ('4G') or in the so-called 'Next Generation' ('5G') systems employing a non-terrestrial portion comprising airborne or spaceborne network nodes.

BACKGROUND ART

Under the 3GPP standards, a NodeB (or an 'eNB' in LTE, 'gNB' in 5G) is a base station via which communication devices connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. End-user communication devices are commonly referred to as User Equipment (UE) which may be operated by a human or comprise automated devices. Such mobile (or even generally stationary) devices are typically operated by a user (and hence they are often collectively referred to as user equipment, 'UE') although it is also possible to connect IoT devices and similar Machine-Type Communication (MTC) devices to the network. For simplicity, the present application will use the term base station to refer to any such base stations and use the term mobile device or UE to refer to any such communication device.

The latest developments of the 3GPP standards cover an evolving communication technology that is expected to support a variety of applications and services such as MTC, IoT/Industrial IoT (IIoT) communications, vehicular communications and autonomous cars, high resolution video streaming, smart city services, and/or the like.

In order to provide enhanced support for MTC devices, 3GPP introduced the 'eMTC' (enhanced MTC) UE category in Release 12, and specified the first low-complexity UE category 0 (Cat-0). Cat-0 supports a reduced peak data rate of 1 Mbps, a single antenna and half duplex frequency division duplex (HD FDD) operation. 3GPP Release 13 introduced support for the so-called 'Cat-M1' UEs which allows additional cost reduction due to a reduced transmission and reception bandwidth of 1.08 MHz, the introduction of a lower UE power class of 20 dBm in addition to the 23 dBm power class. Cat-M1 UEs operate in a narrowband (NB) and they may also support coverage enhanced (CE) operation. In LTE Releases 14 and 15, a new UE category Cat-M2 was specified with 5 MHz transmission and reception bandwidth.

In Release 13 3GPP started to work on Narrowband Internet-of-Things (NB-IoT) UE with the total baseband bandwidth of 180 kHz. NB-IoT supports operation on an anchor carrier (where the UE assumes certain signal and channels being transmitted) and on a non-anchor carrier (where such signal and channels are not assumed to be transmitted). Similarly to eMTC, NB-IoT makes use of increased acquisition times and time repetitions to extend the system coverage. However, unlike MTC, NB-IoT does not support measurement reporting and handover in connected mode.

3GPP is also working on specifying an integrated satellite and terrestrial network infrastructure. For example, 3GPP Technical Report (TR) 36.763 V17.0.0 is a study on Narrow-Band Internet of Things (NB-IoT)/enhanced Machine Type Communication (eMTC) support for Non-Terrestrial Networks in Release 17. The term Non-Terrestrial Networks (NTN) refers to networks, or segments of networks, that are using an airborne or spaceborne vehicle for transmission.

Satellites refer to spaceborne vehicles in Geostationary Earth Orbit (GEO) or in Non-Geostationary Earth Orbit (NGEO) such as Low Earth Orbits (LEO), Medium Earth Orbits (MEO), and Highly Elliptical Orbits (HEO). Airborne vehicles refer to High Altitude Platforms (HAPs) encompassing Unmanned Aircraft Systems (UAS)—including tethered UAS, Lighter than Air UAS and Heavier than Air UAS—all operating quasi-stationary at an altitude typically between 8 and 50 km.

3GPP TR 38.811 V15.4.0 is a study on New Radio to support such Non-Terrestrial Networks. The study includes, amongst others, NTN deployment scenarios and related system parameters (such as architecture, altitude, orbit etc.) and a description of adaptation of 3GPP channel models for Non-Terrestrial Networks (propagation conditions, mobility, etc.). 3GPP TR 38.821 V16.1.0 provides further details about NTN.

NTN access typically features the following elements (amongst others):

- NTN Terminal: It may refer to a 3GPP UE or a terminal specific to the satellite system in case the satellite doesn't serve directly 3GPP UEs.
- A service link which refer to the radio link between the user equipment and the space/airborne platform (which may be in addition to a radio link with a terrestrial based RAN).
- A space or an airborne platform.
- Gateways ('NTN Gateways') that connect the satellite or aerial access network to the core network. It will be appreciated that gateways will mostly likely be co-located with a base station.
- Feeder links which refer to the radio links between the gateways and the space/airborne platform.

Satellite or aerial vehicles may generate several beams over a given area to provide respective NTN cells. The beams have a typically elliptic footprint on the surface of the Earth.

3GPP intends to support three types of NTN beams or cells:

- Earth-fixed cells characterized by beam(s) covering the same geographical areas all the time (e.g. GEO satellites and HAPS);
- quasi-Earth-fixed cells characterized by beam(s) covering one geographic area for a finite period and a different geographic area during another period (e.g. NGEO satellites generating steerable beams); and
- Earth-moving cells characterized by beam(s) covering one geographic area at one instant and a different geographic area at another instant (e.g. NGEO satellites generating fixed or non-steerable beams).

With satellite or aerial vehicle keeping position fixed in terms of elevation/azimuth with respect to a given earth point e.g. GEO and UAS, the beam footprint is earth fixed.

With satellite circulating around the earth (e.g. LEO) or on an elliptical orbit around the earth (e.g. HEO) the beam footprint may be moving over the Earth with the satellite or aerial vehicle motion on its orbit. Alternatively, the beam footprint may be Earth-fixed (or quasi-Earth-fixed) temporarily, in which case an appropriate beam pointing mechanism (mechanical or electronic steering) may be used to compensate for the satellite or aerial vehicle motion.

LEO satellites may have steerable beams in which case the beams are temporarily directed to substantially fixed footprints on the Earth. In other words, the beam footprints (which represent NTN cell) are stationary on the ground for a certain amount of time before they change their focus area over to another NTN cell (due to the satellite's movement on its orbit). From cell coverage/UE point of view, this results in cell changes happening regularly at discrete intervals because different Physical Cell Identities (PCIs) and/or Synchronization Signal/Physical Broadcast Channel (PBCH) blocks (SSBs) have to be assigned after each service link change, even when these beams serve the same land area (have the same footprint). LEO satellites without steerable beams cause the beams (cells) moving on the ground constantly in a sweeping motion as the satellite moves along its orbit and as in the case of steerable beams, service link change and consequently cell changes happen regularly at discrete intervals. Similarly to service link changes, feeder link changes also happen at regular intervals due to the satellite's movement on its orbit.

As described in 3GPP TR 36.763, 3GPP's current approach is that existing cellular IoT features specified up to Release 16 (such as support of 4G/5G core network, Early Data Transmission (EDT), Preconfigured Uplink Resources (PUR), Self-Organising Network (SON) functionality, etc.) can be enabled in NTN deployments unless they require major change for adaptation to NTN.

However, there are a number of features that still have not been specified for NB-IoT operation, including: support of 5G core; adjustments to existing mobility mechanisms to adapt functionality to NTN (such as new parameter values, timings etc.); support of discontinuous coverage without excessive UE power consumption and without excessive failures/recovery actions; and enhancements to existing power saving mechanisms such as Discontinuous Reception (DRX) and enhanced DRX (eDRX), Power Saving Mode (PSM), relaxed monitoring, and Wake-Up Signals (WUS).

The inventors have realised that, due to satellite/aerial vehicle movement or beam hopping (in other words, due to intermittent availability of NTN cells), some UEs may be out of coverage in a significant amount of time. In the worst case, a UE may be in coverage only for a brief period when the satellite is flying by. A UE may be configured to use (e) DRX/PSM and wake up for paging monitoring and data transfer. In this case, the network can page the UE only when the UE is within coverage and the UE enters an active period according to its idle using (e) DRX/PSM configuration. If the UE's waking up window (determined by eDRX or PSM) mismatches the coverage window in the NTN portion of the network (determined by UE position and/or satellite orbit and may not be known by the network), paging may not reach the UE which would result in unnecessary delay and wasting of system resources (since the UE needs to wake up during an overlapping part of the paging window and the coverage window). This potential issue is illustrated in FIG. 5 in which the UE cannot receive paging in Scenario B (when the paging window and the coverage window of the UE do not overlap).

In legacy systems, power saving mode is set up in Radio Resource Control (RRC) connected mode, using appropriate Non-Access Stratum (NAS) signalling. FIG. 6 shows an exemplary procedure for setting up PSM for a UE (P1) and a procedure for cancelling PSM (P2). PSM operation relies on two timers (T3324 and T3412) the value of which is set by the core network and indicated to the UE by the core network node (e.g. Mobility Management Entity (MME), Access and Mobility Management Function (AMF), or any other name of entities). After getting the permission to use the PSM, the UE enters power saving mode upon expiry of T3324 (which is (re) started as soon as the UE enters idle mode). The UE ends power saving mode when it initiates any mobile originated data or signalling (such as periodic Tracking Area Update (TAU) messages). Although the network can adjust the values of the relevant PSM timers for each UE, with certain limitations, the network needs to take into account the potentially discontinuous coverage of the UE. When a large number of UEs (e.g. UEs served by the same satellite) have similar coverage windows and similar PSM configurations, cell switch and associated TAU signalling is likely to happen substantially at the same time for these UEs causing a peak load.

When a UE is configured with eDRX, the UE monitors paging opportunities during its associated paging transmission window (PTW) only. The specific PTW to be used is determined based on the identifier of the UE (UE-ID). Even though the PTW length and eDRX cycle are configurable per UE, the PTW position of different UEs are spread out evenly in time based on their associated UE-IDs. FIG. 10 illustrates the scenario in which two UEs ('UEx' and 'UEy') have the same (or substantially the same) eDRX configuration but different PTW determined by their associated UE-ID. Whilst this method works well when all UEs are in coverage all the time (or nearly all the time), it may not work well for the discontinuous coverage scenario that may occur in NTN.

If a UE is out of coverage only for a relatively small amount/portion of time, this issue may be ignorable. However, if the UE is out of coverage for a relatively large amount/portion of time, the current eDRX technique may not be able to adequately match the UE's PTW with its coverage window, and it may not be able to adapt the PTW to the coverage window which may vary in time due to the UE moving.

SUMMARY OF INVENTION

Solution to Problem

Accordingly, the present invention seeks to provide methods and associated apparatus that address or at least alleviate (at least some of) the above-described issues.

Although for efficiency of understanding for those of skill in the art, the invention will be described in detail in the context of a 3GPP system (LTE/5G networks including NTN), the principles of the invention can be applied to other systems as well.

In one aspect, the invention provides a method of a user equipment (UE) for communicating via a non-terrestrial network, the method comprising: determining whether the UE is in coverage of the non-terrestrial network or out-of-coverage of the non-terrestrial network; and initiating a procedure for power saving of the UE, based on the determining.

In one aspect, the invention provides a method of a network node for communicating to a user equipment (UE) via a non-terrestrial network, the method comprising: transmitting to the UE, information for controlling power saving based on determining whether the UE is in coverage or out of coverage based on the value, such that the UE initiates a procedure for the power saving of the UE based on the determining.

In one aspect, the invention provides a user equipment (UE) for communicating via a non-terrestrial network, the user equipment (UE) comprising: means for determining whether the UE is in coverage of the non-terrestrial network or out-of-coverage of the non-terrestrial network; and means for initiating a procedure for power saving of the UE, based on the determining.

In one aspect, the invention provides a network node for communicating to a user equipment (UE) via a non-terrestrial network, the network node comprising: means for transmitting to the UE, information for controlling power saving based on determining whether the UE is in coverage or out of coverage based on the value, such that the UE initiates a procedure for the power saving of the UE based on the determining.

Advantageous Effects of Invention

Aspects of the invention extend to corresponding systems and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example, with reference to the accompanying drawings in which.

DESCRIPTION OF EMBODIMENTS

<Overview>

Figure 1:
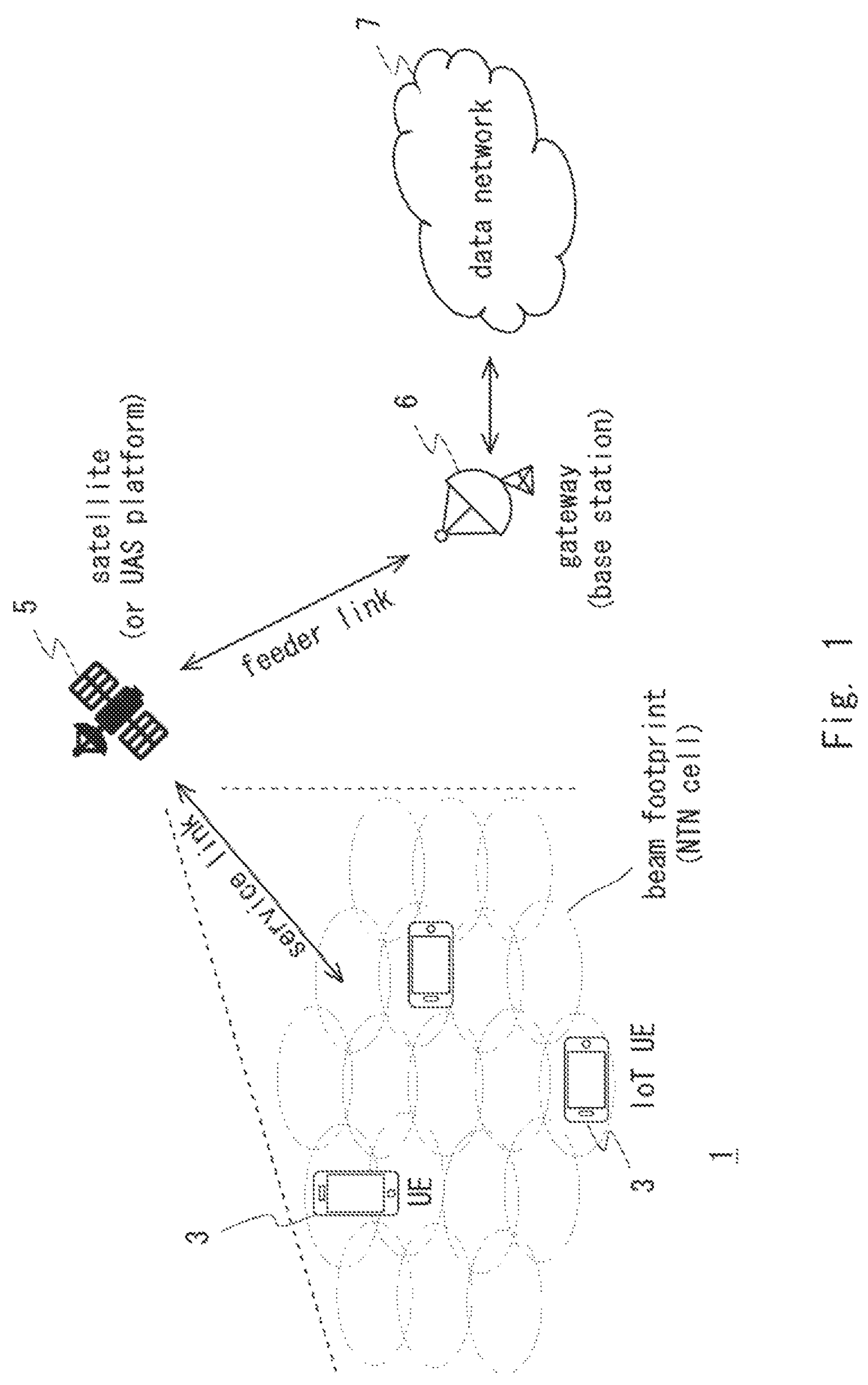
FIG. 1 illustrates schematically a mobile (cellular or wireless) telecommunication system to which embodiments of the invention may be applied.

FIG. 1 illustrates schematically a mobile (cellular or wireless) telecommunication system 1 to which embodiments of the invention may be applied.

In this system 1, users of mobile devices 3 (UEs) can communicate with each other and other users via access network nodes respective satellites 5 and/or base stations 6 and a data network 7 using an appropriate 3GPP radio access technology (RAT), for example, an E-UTRA (4G) and/or NR (5G) RAT. In case of an E-UTRA RAT, the base station 6 may be referred to as an 'eNB' or 'ng-eNB' and in case of an NR RAT, the base station 6 may be referred to as a 'gNB'. The UEs 3 may comprise NB-IoT or MTC UEs or they may include appropriate NB-IoT or MTC functionality. As those skilled in the art will appreciate, whilst three UEs 3, one satellite 5, and one base station 6 are shown in FIG. 1 for illustration purposes, the system, when implemented, will typically include other satellites/UAS platforms, base stations/RAN nodes, and mobile devices (UEs).

It will be appreciated that a number of base stations 6 form a (radio) access network or (R)AN, and a number of NTN nodes 5 (satellites and/or UAS platforms) form a Non-Terrestrial Network (NTN). Each NTN node 5 is connected to an appropriate gateway (in this case co-located with a base station 6) using a so-called feeder link and connected to respective UEs 3 via corresponding service links. Thus, when served by an NTN node 5, a mobile device 3 communicates data to and from a base station 6 via the NTN node 5, using an appropriate service link (between the mobile device 3 and the NTN node 5) and a feeder link (between the NTN node 5 and the gateway/base station 6). In other words, the NTN forms part of the (R)AN, although it may also provide satellite communication services independently of E-UTRA and/or 5G communication services.

Although not shown in FIG. 1, neighbouring base stations 6 are connected to each other via an appropriate base station to base station interface (such as the so-called 'X2' interface, 'Xn' interface, and/or the like). The base stations 6 are also connected to the data network nodes via an appropriate interface (such as the so-called 'S1', 'NG-C', 'NG-U' interface, and/or the like).

The data (or core) network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). Typically, the data network 7 will include user plane entities and control plane entities. The so-called Mobility Management Entity (MME) 9 in 4G, or the Access and Mobility Management Function (AMF) in 5G, is responsible for handling connection and mobility management tasks for the mobile devices 3, including configuring any power saving mechanisms. The data network 7 is also coupled to other data networks such as the Internet or similar Internet Protocol (IP) based networks (not shown in FIG. 1).

Each NTN node 5 controls a number of directional beams via which associated NTN cells may be provided. Specifically, each beam has an associated footprint on the surface of the Earth which corresponds to an NTN cell. Each NTN cell (beam) has an associated Physical Cell Identity (PCI) and/or beam identity. The beam footprints may be moving as the NTN node 5 is travelling along its orbit. Alternatively, the beam footprint may be earth fixed, in which case an appropriate beam pointing mechanism (mechanical or electronic steering) may be used to compensate for the movement of the NTN node 5.

The network and the mobile devices 3 may also support one or more power saving mechanisms such as Discontinuous Reception (DRX) and enhanced DRX (eDRX), Power Saving Mode (PSM), relaxed monitoring, and Wake-Up Signals (WUS).

Figure 6:
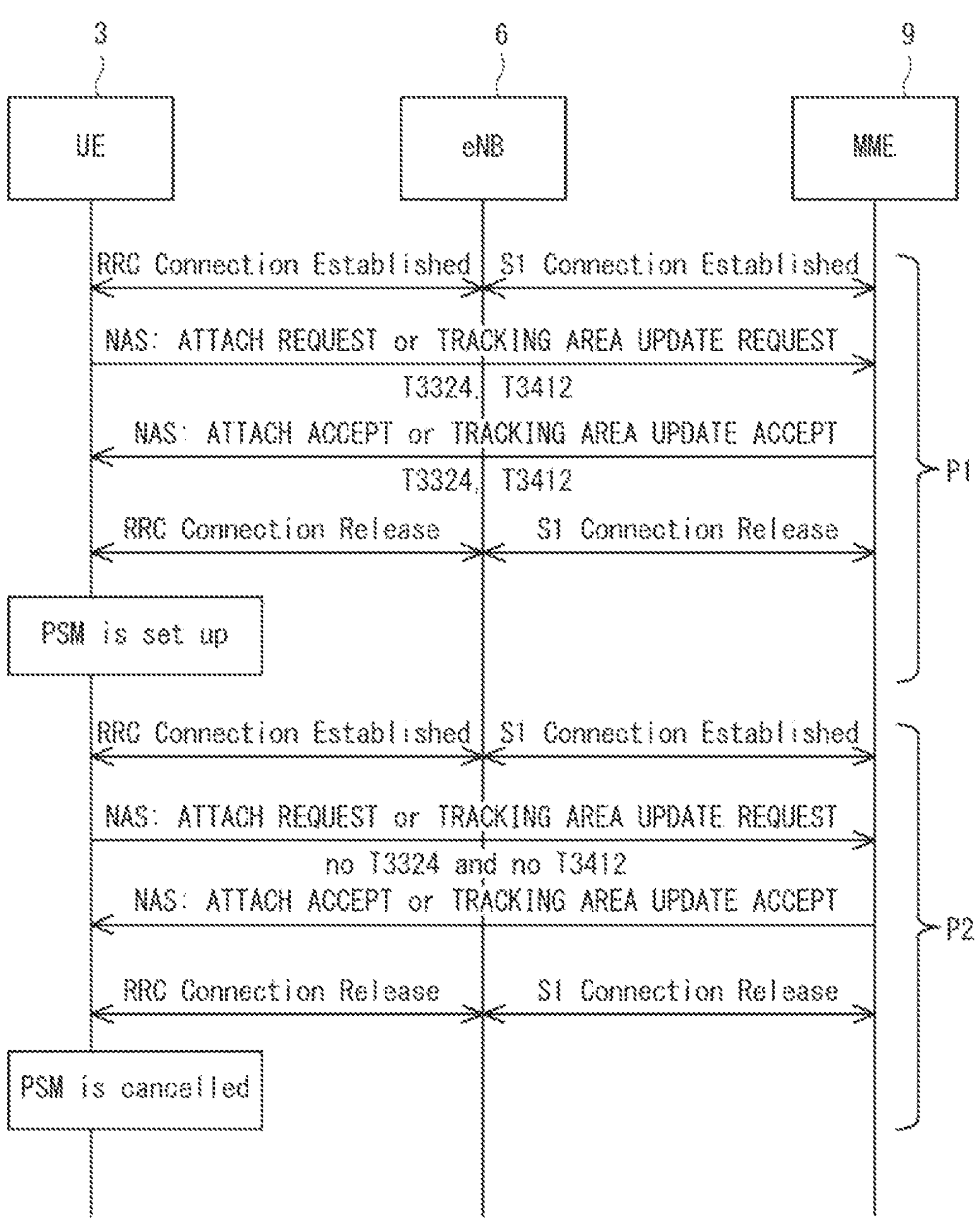
FIG. 6 illustrates schematically the procedures for setting up and cancelling power saving mode.

PSM may be configured to compatible mobile devices 3 in Radio Resource Control (RRC) connected mode as generally shown in the procedure denoted 'P1' of FIG. 6.

In order to configure PSM for a mobile device 3, the network (in this case the core network node 9) provides the values of two timers associated with the power saving mode operation (applicable to that mobile device 3). The first timer (also known as 'T3324') controls how long the mobile device 3 needs to remain in RRC idle mode before activating PSM. The second timer (also known as 'T3412') controls how often the mobile device 3 needs to perform a periodic Tracking Area Update (TAU). Effectively, the second timer controls the maximum length of each power saving mode activation since at the expiry of the second timer the mobile device 3 needs to enter RRC connected mode in order to transmit TAU messages (for notifying the network/core network node about the current location of the mobile device 3). Alternatively, the mobile device 3 may enter RRC connected mode before expiry of the second timer (and cancel PSM), for example, when it has uplink data to send (which cannot be delayed) or when it moves to a different tracking area.

In this system, once the mobile device 3 enters RRC idle mode, it starts the first timer (T3324) and starts monitoring whether the mobile device 3 is in coverage or out of coverage for controlling (the start and end of) the power saving mode operation. Specifically, the mobile device 3 activates PSM upon moving out of coverage whilst the first timer is running. If the mobile device 3 remains in coverage whilst the timer is running, it activates PSM upon expiry of the timer.

The network may provide satellite information to the mobile device 3 via broadcast information or dedicated signalling (e.g. Access Stratum or Non-Access Stratum signalling). Based on satellite information and UE location (if available), the mobile device 3 can predict or estimate its subsequent in-coverage window (or windows). The mobile device 3 may suspend monitoring whether the mobile device 3 is in coverage or out of coverage until the predicted in-coverage window.

Upon expiry of the second timer (T3412), the mobile device 3 remains in PSM as long as it is determined (based on monitoring) or expected (based on prediction) to be out of coverage. Similarly, upon arrival of uplink data (e.g. before expiry of the second timer), the mobile device 3 remains in PSM as long as it is out of coverage. Thus, effectively, the mobile device 3 is able to extend the PSM activation and achieve additional power saving depending on its available coverage.

Optionally, an RRC Idle mode mobile device 3 may be configured to run the first timer only when it is in coverage (based on monitoring or prediction) and to suspend the timer whenever the mobile device 3 moves out of coverage (or it is predicted to be out of coverage). However, in this case, the mobile device 3 will resume the timer as soon as it (re) enters idle mode (from out of coverage). Effectively, this approach keeps the mobile device 3 in RRC Idle mode longer and delays activation of the PSM.

In case of NTN, there may be a relatively large number of UEs 3 with similar in-coverage windows. Thus, when several UEs 3 enter the coverage of an NTN cell substantially at the same time, they may trigger (delayed) uplink data and/or TAU transmissions substantially at the same time which may cause excessive load on the network and may result in data loss. In order to avoid such excessive load and data loss, the UEs 3 may be configured to use an appropriate backoff timer upon entering coverage (after expiry of their associated second PSM timer). In other words, a mobile device configured with such a backoff timer will delay initiating its transition to RRC connected mode and/or its transmission of uplink data/TAU signalling until expiry of the backoff timer. This backoff value may be a PSM specific backoff value, an NTN specific backoff value, eMTC/IoT specific backoff value, and/or a TAU specific backoff value, as appropriate, and it may be transmitted to the UEs 3 via broadcast or via dedicated signalling. The backoff timer may be different for different UEs which will allow spreading the load over time. A specific backoff timer value may be configured by the network (e.g. the base station 6/core network node 9) for each UE 3. Alternatively, the value of the backoff timer may be derived randomly (e.g. selected between '0' and a maximum backoff timer value set by the network). When such a backoff timer is not configured by the network (or when it is set to '0'), the mobile device 3 can transmit any uplink data/TAU signalling immediately upon entering coverage.

When a compatible mobile device 3 is configured with eDRX, the mobile device 3 monitors paging occasions during specific paging transmission windows (PTWs) only. In this system, the PTW is configured based on information provided by the network such as information identifying a starting point(s) of the PTW(s), a PTW offset, and/or a pair of Hyper System Frame Number (H-SFN) and System Frame Number (SFN) values associated with the PTW. This approach may be beneficial when the mobile device 3 is served via the NTN portion of the network although it may be applicable to other UEs as well.

In order to facilitate configuring an appropriate PTW for the mobile device 3, the mobile device 3 may transmit to the network (e.g. core network node 9) appropriate assistance information that can be used in configuring the PTW for the mobile device 3. The assistance information may identify a recommended or preferred PTW start point (e.g. H-SFN, SFN pair), a recommended or preferred PTW length, any in-coverage time prediction, and/or a current or predicted UE position.

Beneficially, this approach allows matching/adapting the PTW to the coverage window of the mobile device 3, in case when the mobile device 3 is out of coverage for a relatively large amount/portion of time, even if the mobile device 3 is moving.

<User Equipment (UE)>

Figure 2:
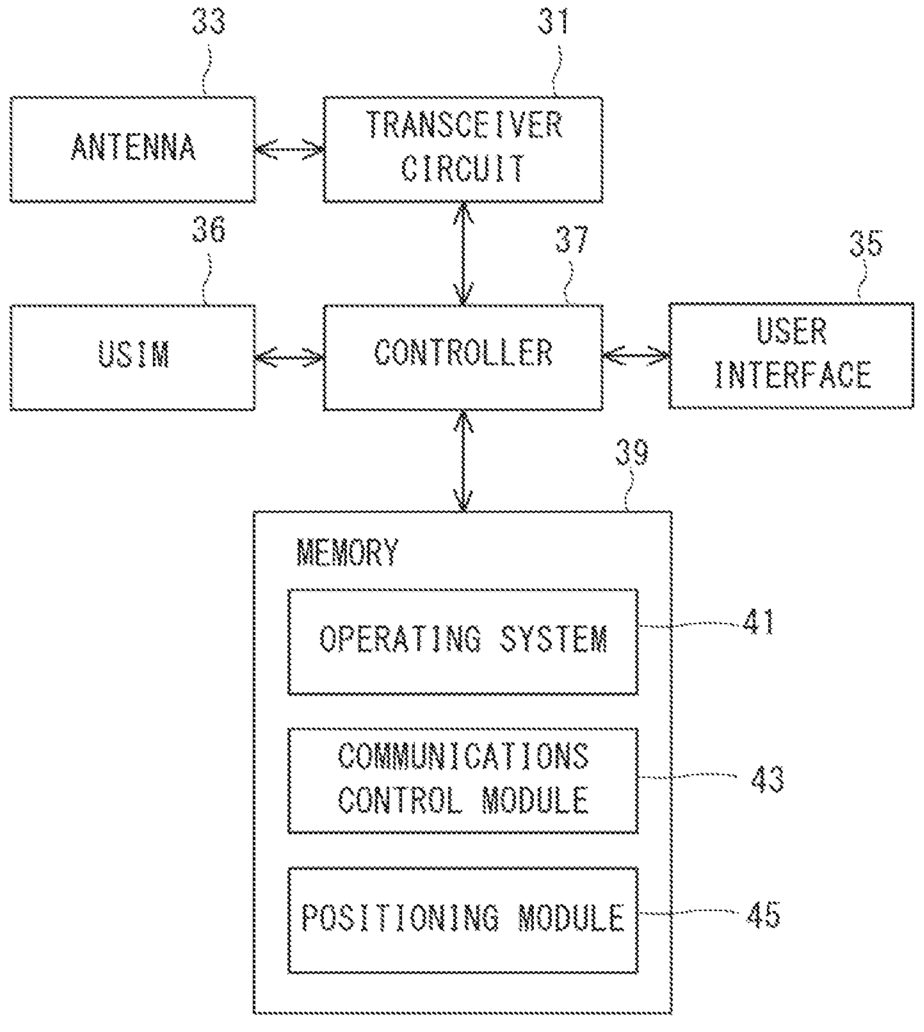
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35 and a Universal Subscriber Identity Module (USIM) 36) which may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and a positioning module 45 (which is optional in some UEs).

The communications control module 43 is responsible for handling (generating/sending/receiving) signalling messages and uplink/downlink data packets between the UE 3 and other nodes, including NTN nodes 5, (R)AN nodes 6, and core network nodes. The signalling may comprise control signalling related to a power saving mode operation or a DRX/eDRX operation of the UE 3. When the UE 3 is configured to operate in eMTC/IoT/NB-IoT/IoT-NTN mode, the operation of the communications control module 43 is adapted accordingly.

If present, the positioning module 45 is responsible for determining the position of the UE 3, for example based on Global Navigation Satellite System (GNSS) signals.

<Access Network Node (Base Station/Gateway) and NTN Node>

Figure 3:
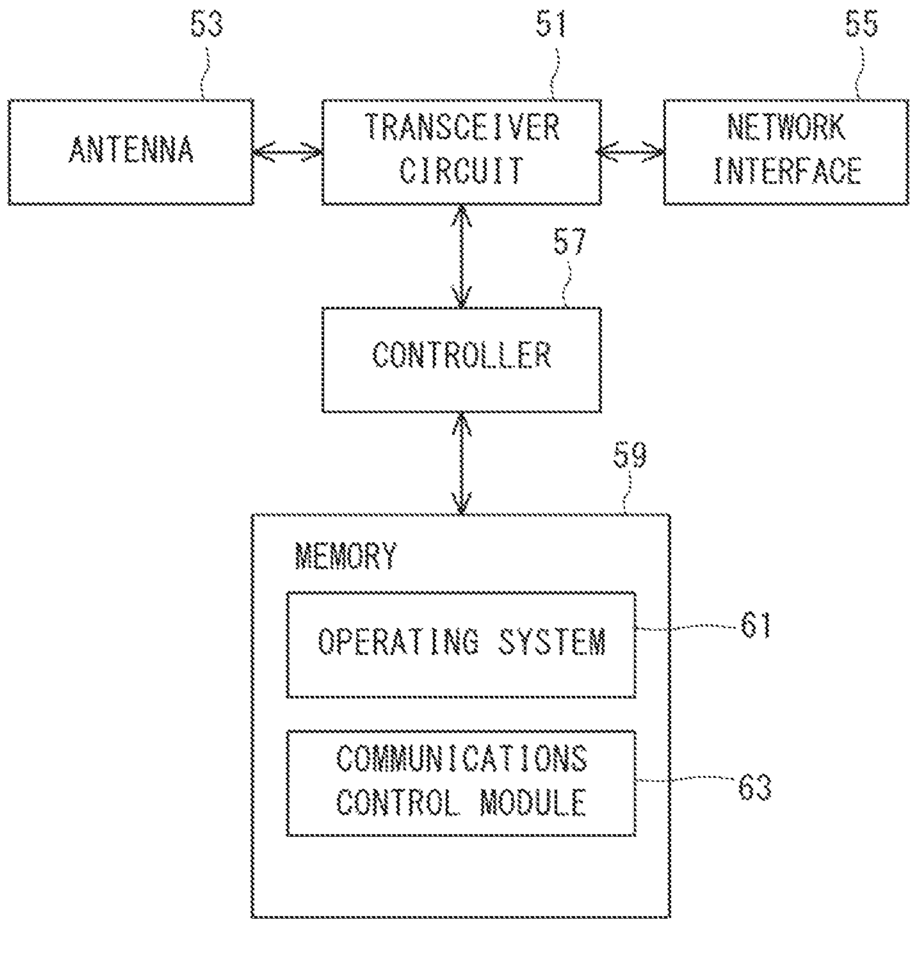
FIG. 3 is a schematic block diagram of an access network node (e.g. base station) or an NTN node (e.g. satellite/UAS platform) forming part of the system shown in FIG. 1.

FIG. 3 is a block diagram illustrating the main components of an access network node 6 (such as the base station (gNB) or the gateway) shown in FIG. 1. FIG. 3 is also applicable to the NTN node 5 (satellite or UAS platform). As shown, the access network node 6/NTN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. Signals may be transmitted to and received from the UE(s) 3 either directly and/or via one or more NTN node(s) 5, as appropriate. The network interface 55 typically includes an appropriate base station—base station interface (such as X2/Xn) and an appropriate base station—core network interface (such as S1/NG-C/NG-U), although some of these may be optional in case of the NTN node 5. A controller 57 controls the operation of the access network node 6/NTN node 5 in accordance with software stored in a memory 59. The software may be pre-installed in the memory 59 and/or may be downloaded via the telecommunication network 1 or from a removable data storage device (RMD), for example. The software includes, among other things, an operating system 61, and a communications control module 63.

The communications control module 63 is responsible for handling (generating/sending/receiving) signalling between the access network node 6/NTN node 5 and other nodes, such as the UE 3, other NTN nodes 5/base stations 6, and core network nodes 9 (e.g. the MME). The signalling may comprise control signalling related to a power saving mode operation or a DRX/eDRX operation of the UE 3.

<Core Network Node>

Figure 4:
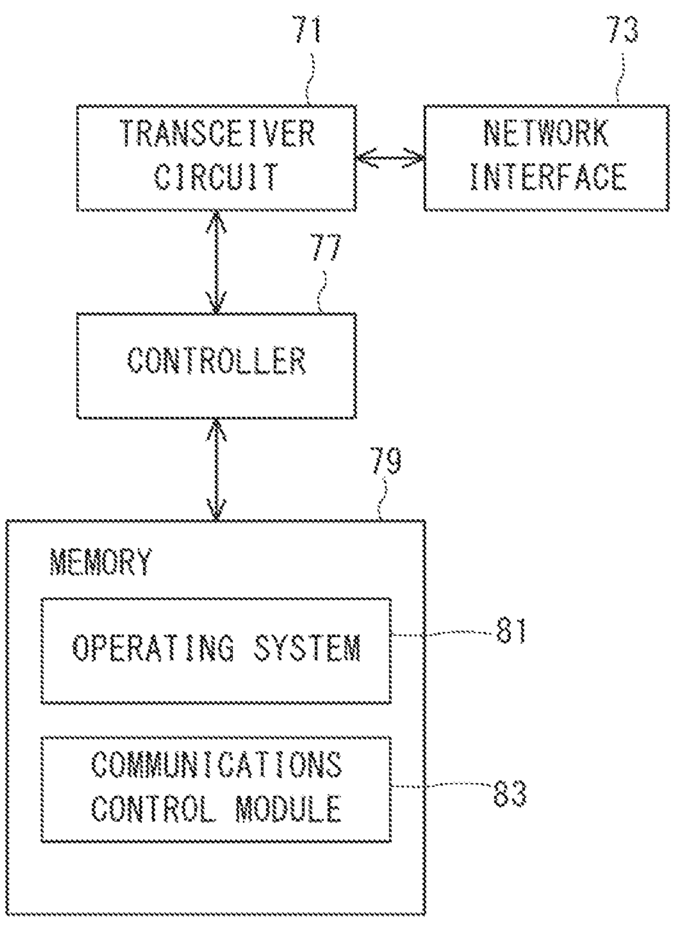
FIG. 4 is a schematic block diagram of a core network node (e.g. MME, AMF, etc.) forming part of the system shown in FIG. 1.
Figure 4:
Figure 5:
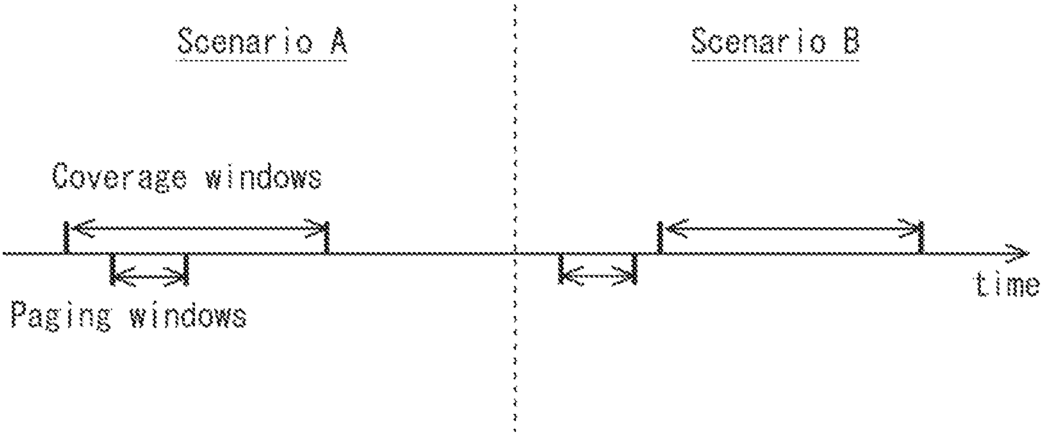
FIG. 5 illustrates schematically two possible scenarios during power saving mode operation in non-terrestrial networks.

FIG. 4 is a block diagram illustrating the main components of a core network node 9 shown in FIG. 1, such as the MME, AMF, etc. As shown, the core network node 9 includes a transceiver circuit 71 which is operable to transmit signals to and to receive signals from other network nodes (either directly or indirectly) via a network interface 75. The network interface 75 typically includes an appropriate core network-base station interface (such as S1/NG-C/NG-U). A controller 77 controls the operation of the core network node 9 in accordance with software stored in a memory 79. The software may be pre-installed in the memory 79 and/or may be downloaded via the telecommunication network 1 or from a removable data storage device (RMD), for example. The software includes, among other things, an operating system 81, and a communications control module 83.

The communications control module 83 is responsible for handling (generating/sending/receiving) signalling between the core network node 9 and the UE 3, the access network nodes, and other core network nodes. The signalling may comprise control signalling related to a power saving mode operation or a DRX/eDRX operation of the UE 3.

DETAILED DESCRIPTION

The following is a description of some exemplary procedures (referred to as Solutions 1 to 3) performed by the nodes of the system shown in FIG. 1.

<Solution 1>

PSM may be configured to compatible UEs 3 in Radio Resource Control (RRC) connected mode. In particular, PSM may be beneficial for eMTC/NB-IoT devices served by the NTN portion of the network, although other type of UEs may also be configured to use PSM, if appropriate.

As generally shown in the procedure denoted 'P1' of FIG. 6, the network (in this case the core network node 9) configures PSM for a UE 3 by providing the values of two timers associated with the power saving mode operation (applicable to that mobile device 3). The network/core network node 9 can instruct the UE 3 to turn off the PSM operation if it does not provide the values of these timers, as generally shown in the procedure denoted 'P2'.

When provided to the UE 3, the first timer ('T3324') controls how long the UE 3 needs to remain in RRC idle mode before activating PSM. The second timer ('T3412') controls how often the UE 3 needs to perform a periodic Tracking Area Update (TAU), unless the UE 3 moves to a different tracking area. Effectively, the second timer controls the maximum length of each power saving mode activation since at the expiry of the second timer the UE 3 needs to enter RRC connected mode in order to transmit TAU messages (for notifying the network/core network node about the current location of the mobile device 3). The UE 3 may cancel PSM and enter RRC connected mode for other reasons than TAU signalling, for example, when it has uplink data to send (which cannot be delayed).

Figure 7:
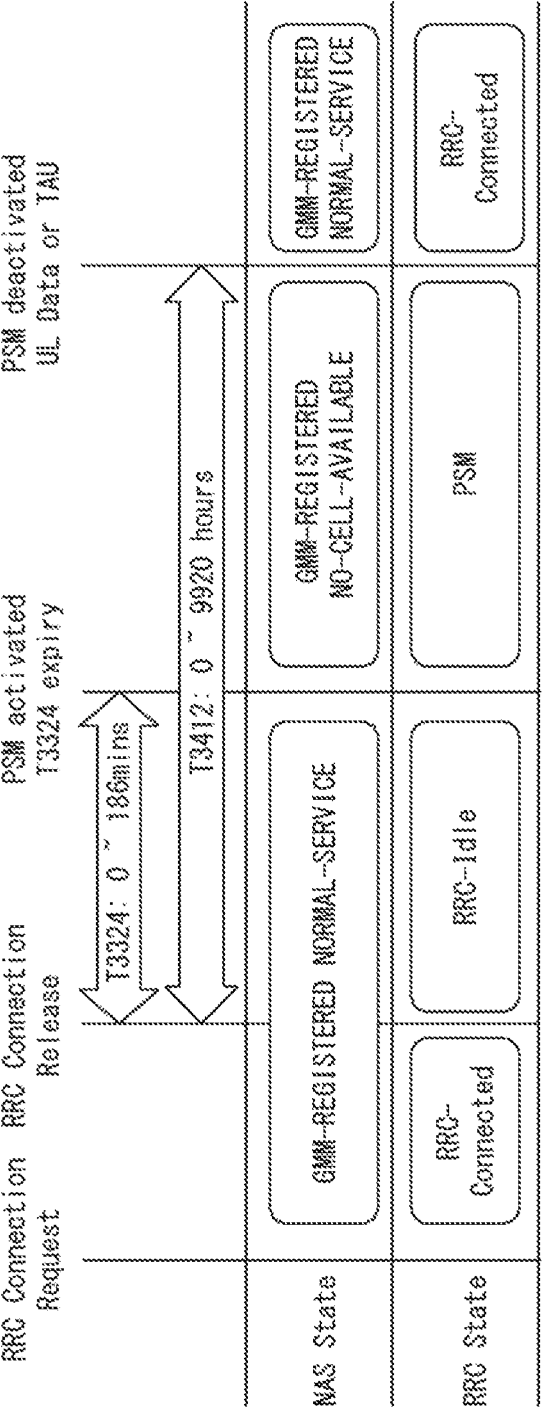
FIG. 7 illustrates schematically some exemplary ways in which the present invention may be implemented by the UE shown in FIG. 1.
Figure 8:
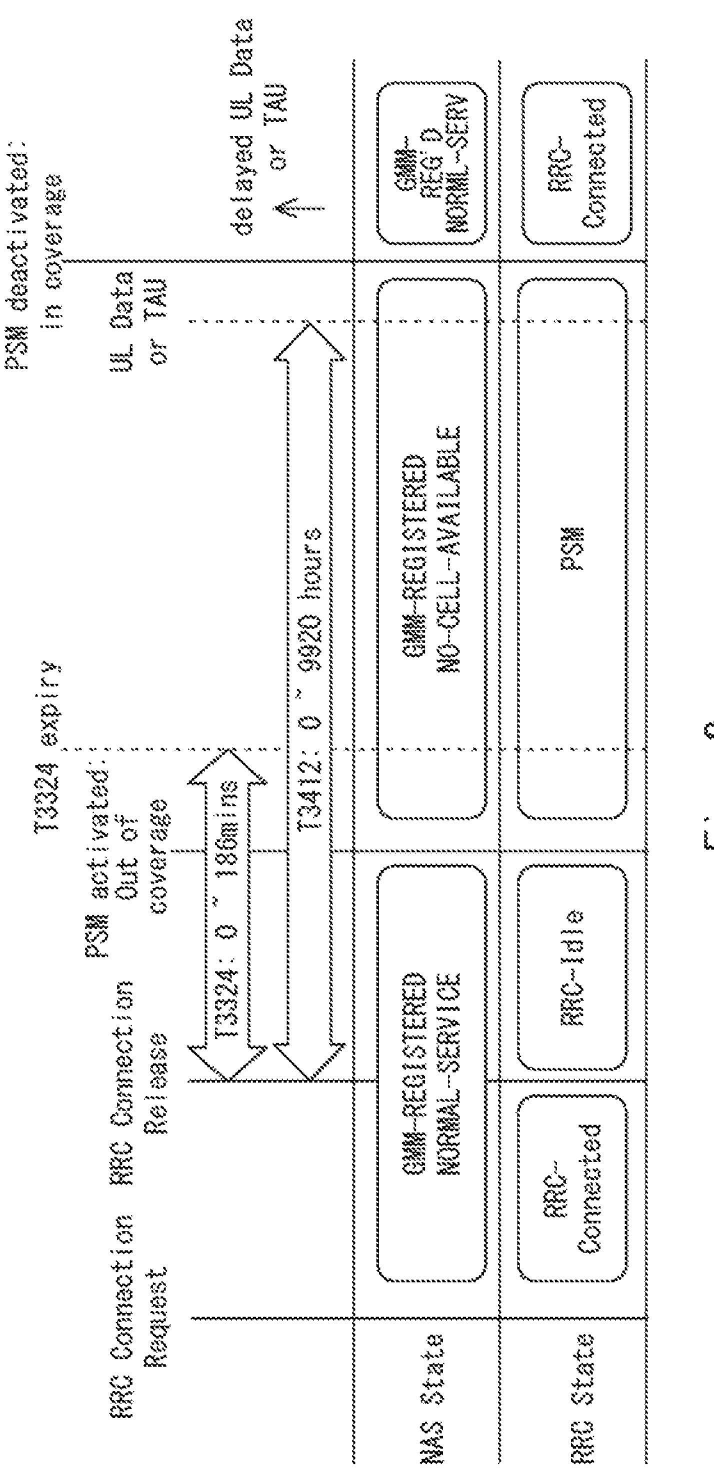
FIG. 8 illustrates schematically some exemplary ways in which the present invention may be implemented by the UE shown in FIG. 1.
Figure 9:
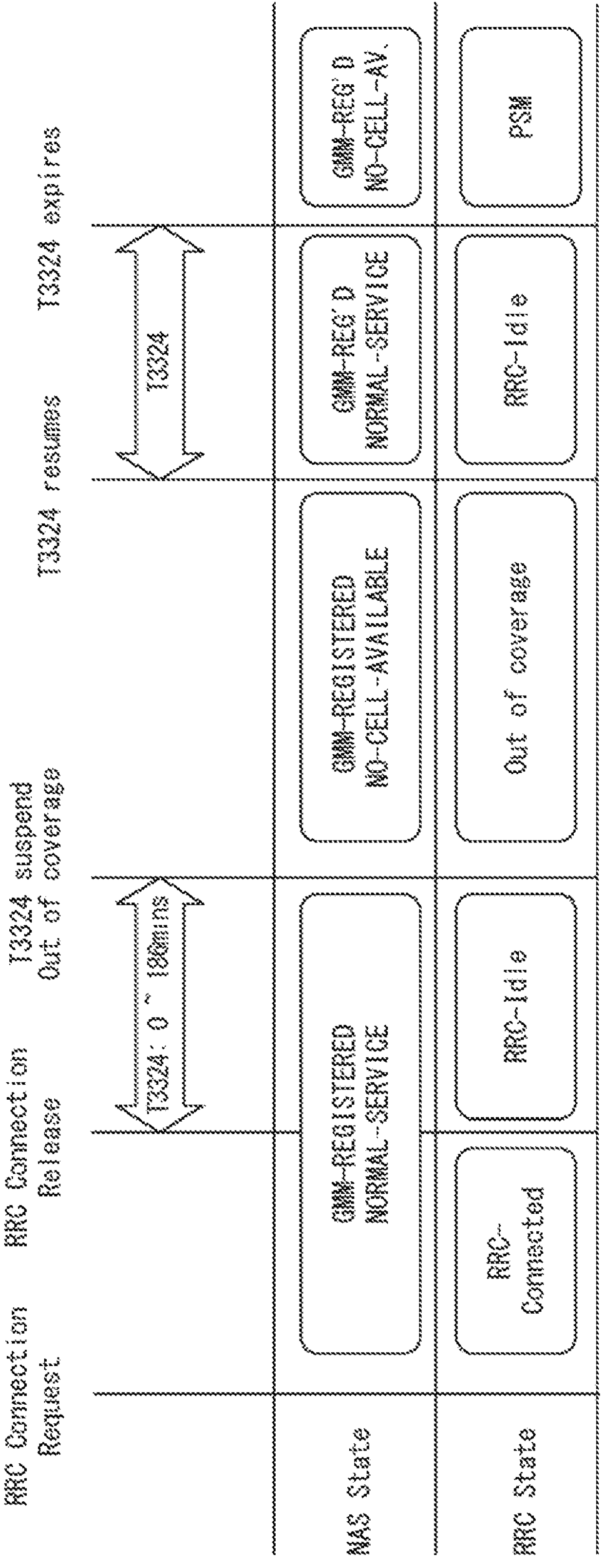
FIG. 9 illustrates schematically some exemplary ways in which the present invention may be implemented by the UE shown in FIG. 1.

Turning now to FIGS. 7 to 9, once the UE 3 enters RRC idle mode, it starts the first timer (T3324) and starts monitoring whether the UE 3 is in coverage or out of coverage for controlling (the start and end of) the power saving mode operation.

There are three ways for activating PSM, in dependence of the UE's coverage situation.

If the UE 3 remains in coverage whilst the timer is running, as shown in FIG. 7, the UE 3 activates PSM upon expiry of the timer. In another case, shown in FIG. 8, the UE 3 activates PSM upon moving out of coverage whilst the first timer is running. The third case (shown in FIG. 9) is similar to the first case. However, in this case the UE 3 does not take into account any period spent out-of-coverage for the first timer. As can be seen, when (whenever) the UE 3 loses coverage, it suspends the first timer (T3324) and resumes it only when the UE 3 is actually in the RRC idle mode (back in coverage).

In order to facilitate determining whether the UE 3 is in coverage or out-of-coverage at a specific time and/or location, the network may provide satellite information to the UE 3 via broadcast information or dedicated signalling (e.g. Access Stratum or Non-Access Stratum signalling). Based on such satellite information and UE location (if available), the UE 3 can predict or estimate its subsequent in-coverage window (or windows) and control the timer accordingly. Moreover, the mobile device 3 can suspend monitoring whether the mobile device 3 is in coverage or out of coverage until the predicted in-coverage window to preserve battery.

In each case, the UE 3 remains in PSM at least until expiry of the second timer (T3412), or until arrival of uplink data (including TAU signalling in case the UE 3 moved to a new tracking area). However, in one possibility, shown in FIG. 8, the UE 3 may remain in PSM upon expiry of the second timer (T3412) or upon arrival of uplink data, until it is determined (based on monitoring) or expected (based on prediction) to be back in coverage.

In a particularly beneficial option, cancellation/deactivation of PSM is based on a backoff timer, which may be started upon expiry of the second timer or upon entering network coverage (if later). Such backoff timers alleviate, or spread out, the network load caused by the relatively large number of UEs 3 with similar in-coverage windows, and similar timing of their respective (delayed) uplink data and/or TAU transmissions upon entering the coverage of an NTN cell.

In more detail, the UEs 3 may be configured to start an appropriate backoff timer upon entering coverage (after expiry of their associated second PSM timer). The backoff timer causes each UE 3 to delay its transmission of uplink data/TAU signalling until expiry of the backoff timer. The backoff timer may also delay the UE 3 transitioning to RRC connected mode, thus effectively extending the time spent in PSM.

The backoff value may be transmitted to the UEs 3 via broadcast or via dedicated signalling. The backoff timer may be different for different UEs. This may be realised by configuring a specific backoff timer value for each UE 3. Alternatively, the value of the backoff timer may be derived randomly (e.g. selected between '0' and a maximum backoff timer value set by the network).

The following is a description of some exemplary scenarios in the context of FIGS. 8 and 9, with the following assumptions:

- the UE 3 is under satellite coverage between 8:00 (8:00 a.m.) and 12:00 (12:00 noon) in every 24 hours;
- the UE 3 is configured with timers T3324 and T3412 (PSM time=T3412-T3324);
- T3324=15 minutes; and
- T3412=100 days.

Using the above assumptions, when the UE 3 is experiencing discontinuous coverage (as in case of FIG. 8 or 9), the UE 3 needs to check whether or not it has network coverage when it needs to transmit uplink data or TAU. In other words, when the UE 3 is waking up from PSM (due to having uplink data or TAU to transmit) it needs to first see whether at this time it actually has any network coverage. This may be based on prediction in accordance with satellite ephemeris data, UE location information, and/or the like.

1) UE Wants to Wake Up at 10:00 a.m. To Transmit Uplink Data

When the UE 3 wants to wake up from PSM due to having uplink data/TAU to transmit it can predict that it has network coverage (because the current time is between 8:00 and 12:00). Thus, instead of waking up from PSM straightaway to initiate an RRC procedure/Scheduling Request (SR) for transmitting uplink data, the UE 3 checks whether at this time it can expect to have network coverage. If the UE 3 determines that it does have (or it is predicted to have) network coverage, then the UE 3 wakes up (deactivates PSM), synchronises with the network and transmits uplink data/SR. The data transmission causes the UE 3 to transition to connected mode and then back to idle mode. Once in idle mode again, the UE 3 starts the T3324 timer (which runs for 15 minutes) before going to power saving mode again.

2) UE Wants to Wake Up at 11:55 a.m. To Transmit Uplink Data

In this scenario as well, the UE 3 first checks whether at this time it can expect to have network coverage rather than immediately initiating an RRC procedure/SR to transmit uplink data. At 11:55 am, the UE 3 can predict that it has network coverage. Thus, the UE 3 wakes up (deactivates PSM), synchronises with the network and transmits uplink data/SR.

In this case, the UE behaviour is different depending on whether it follows the approach shown in FIG. 8 or 9. In case of FIG. 8, the UE 3 goes back to idle mode at approximately 11:56 am, when it starts the T3324 timer and runs it for 15 minutes, i.e. until 12:11 pm. However, the UE 3 goes to power saving mode at 12:00 pm due to going out of coverage.

As in case of the alternative illustrated in FIG. 9, the UE 3 may be configured to stop/suspend the timer as soon as the UE 3 is out of coverage and resume the timer once the UE 3 is back in coverage again. Accordingly, when in idle mode again at 11:56 a.m., the UE 3 starts the T3324 timer (for a total of 15 minutes). However, in this case, the timer runs only for four minutes, until 12:00, when it is suspended due to the UE 3 going out of coverage. The timer remains suspended until 8:00 a.m. when the UE 3 enters coverage again at which point it resumes the timer (for the remaining 11 minutes, in this example). As can be seen, the UE 3 enters PSM only at 8:11 a.m. (at expiry of the T3324 timer). Thus, although the UE 3 is not in PSM whilst it is out of coverage, it does not waste power (even if there is uplink data to send) because the UE 3 can determine the time it is expected to be back in coverage and delay any data transmission accordingly.

3) UE Wants to Wake Up at 13:00 (1:00 p.m.) to Transmit Uplink Data

Instead of waking up from PSM straightaway to initiate an RRC procedure/SR for transmitting the uplink data, the UE 3 checks and determines that it does not have (or it is not predicted to have) network coverage at this time. Thus, the UE 3 stays in power saving mode, and starts buffering the data until the UE 3 is in coverage again. At 8:00 a.m. the UE 3 enters network coverage again, thus it wakes up from PSM to transmit buffered data (optionally with a backoff value) while having a network coverage. This scenario results in the same behaviour in both FIG. 8 and FIG. 9.

<Solution 2>

When a compatible mobile device 3 is configured with eDRX, the mobile device 3 monitors paging occasions during specific paging transmission windows (PTWs) only.

Figure 10:
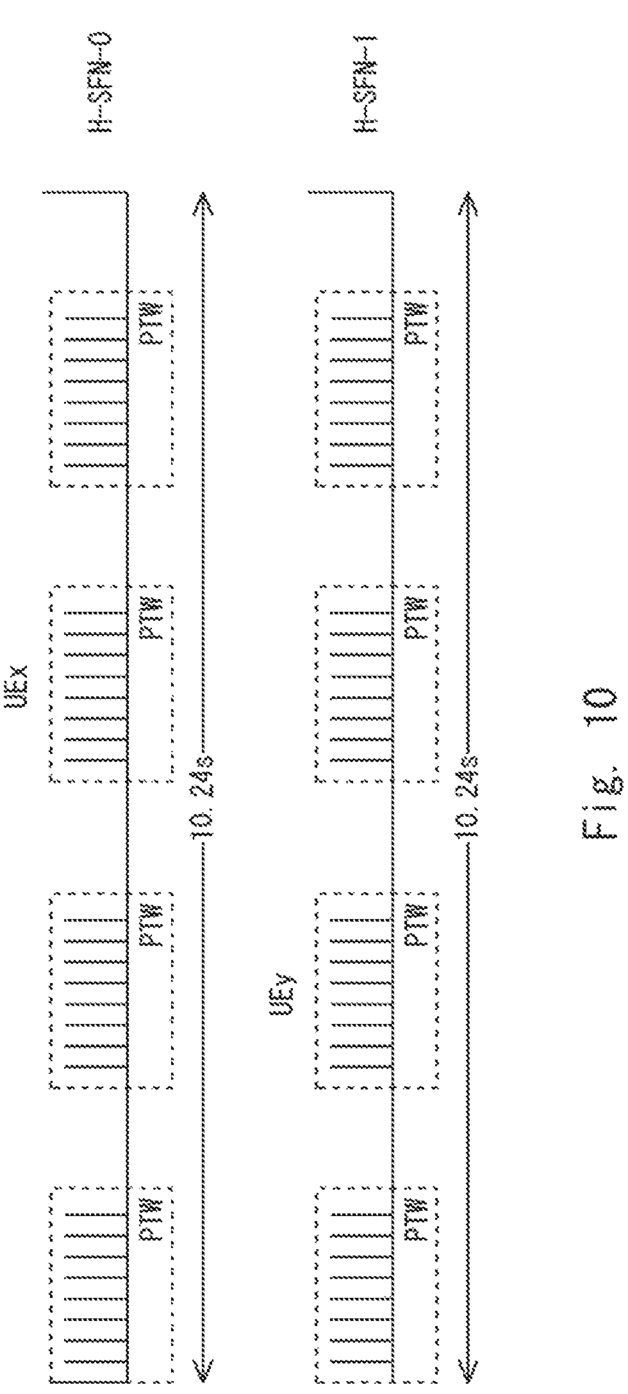
FIG. 10 illustrates schematically some exemplary ways in which the present invention may be implemented by the UE shown in FIG. 1.
Figure 11:
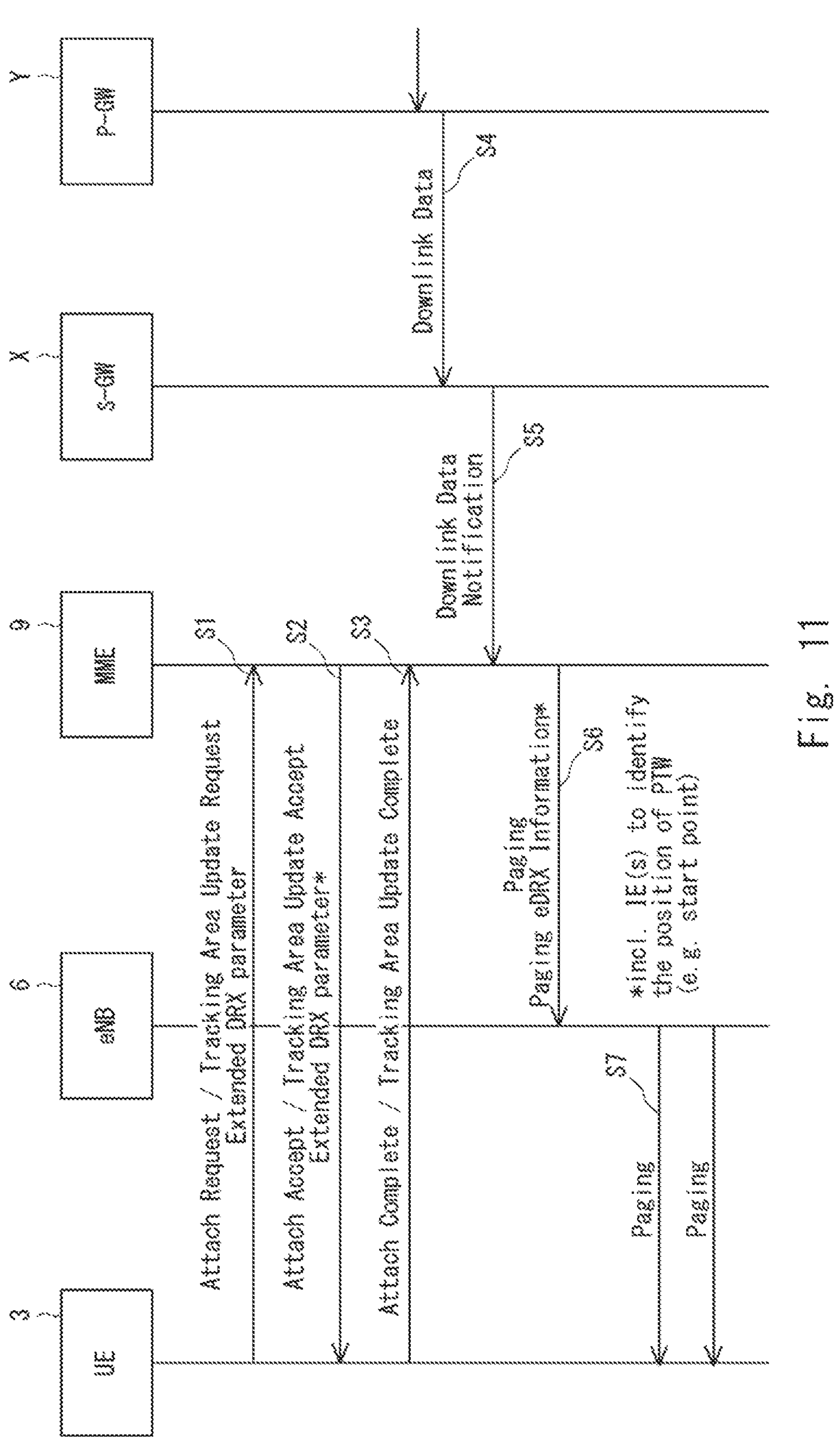
FIG. 11 illustrates schematically some exemplary ways in which the present invention may be implemented by the UE shown in FIG. 1.

As generally shown in FIG. 10, different UEs 3 (in this case 'UEx' and 'UEy') can be configured to use their own network assigned PTW. The overall procedure is shown in FIG. 11, which is based on the existing eDRX based paging procedure.

However, in this case, the network (core network node 9) provides information for an appropriate PTW for a given UE 3. Specifically, such UE specific PTW information may comprise information identifying a starting point(s) of the PTW(s) for that UE 3, a PTW offset, and/or a pair of Hyper System Frame Number (H-SFN) and System Frame Number (SFN) values associated with the PTW. The core network node 9 may send this information to the UE 3 in an appropriate NAS message (see step S2), such as an Attach Accept message or a Tracking Area Update Accept message. In this case, the UE specific information may be included in the so-called 'Extended DRX parameter' information element (or any other suitable information element), in addition to other information elements such as PTW length and eDRX cycle length (which may be common for all UEs).

The UE 3 stores this information, determines its assigned PTW, and monitors paging occasions during the applicable paging transmission windows only.

The UE specific PTW information may also be included in paging messages from the core network node 9 to the base station 6 (see step S6) in order to assist the base station 6 paging each UE 3 at the appropriate time. In this case, the UE specific information may be included in the so-called 'Paging eDRX Information' information element (or any other suitable information element), in addition to PTW length/eDRX cycle length.

In order to facilitate configuring an appropriate PTW for the mobile device 3, the mobile device 3 may transmit to the network (e.g. core network node 9) appropriate assistance information that can be used in configuring the PTW for the mobile device 3. The assistance information may identify a recommended or preferred PTW start point (e.g. H-SFN, SFN pair), a recommended or preferred PTW length, any in-coverage time prediction, and/or a current or predicted UE position.

It will be appreciated that the UE 3 may be configured to use appropriate TAU and/or NAS signalling for providing eDRX assistance information update to the core network node 9. For example, the UE 3 may indicate if the configured eDRX does not match (or no longer matches) its in-coverage window, or indicate that the UE position has changed (e.g. above an associated threshold or distance from a reference point) making it necessary to update the paging window. The TAU/NAS message may include one or more of the following:

eDRX assistance information (extended paging cycle, PTW length and position);

information relating to UE position (e.g. position update); and information relating to UE mobility state (e.g. high, low, or stationary mobility).

<Solution 3>

In existing systems, the PTW is UE-specific and is determined by a Paging Hyperframe (PH), a starting position within the PH (PTW_start), and an ending position (PTW_end). The values of PH, PTW_start, and PTW_end are given by the following formulae.

The PH is the H-SFN satisfying the following equation:

$$H\text{-}SFN \bmod T_{eDRX,H} = (UE\_ID\_H \bmod T_{eDRX,H})$$

where UE_ID_H is the identifier associated with the UE 3 (UE_ID_H may be either the ten or twelve most significant bits of the UE's Hashed ID, depending on which channel is used for paging), and $T_{eDRX,H}$ is the eDRX cycle of the UE 3 given in a number of Hyper-frames ($T_{eDRX,H}$=1, 2, . . . , 256 Hyper-frames).

The parameter PTW_start denotes the first radio frame of the PH that is part of the PTW and has SFN satisfying the following equation:

$$SFN = 256^{*} i_{eDRX} \text{ where}$$

$$i_{eDRX} = \text{floor}(\text{UE\_ID\_H}/T_{eDRX,H})\text{mod}4$$

The parameter PTW_end indicates the last radio frame of the PTW and has SFN satisfying the following equation:

$$SFN = (\text{PTW\_start} + L*100 - 1)\text{mod}1024$$

where L=Paging Time Window length (in seconds) configured by upper layers.

In this system, in order to provide a suitable PTW to those UEs 3 that are expected to be out of coverage for some time (while served by the NTN portion of the network), the values of PH, PTW_start, and PTW_end are re-defined using the following approach:

1. The lower layer of the UE 3 (and that of the base station 6) may be configured to discard any PO outside of the UE's coverage windows. If a paging window partially overlaps with a coverage window, only the part within a coverage window is retained for paging transmission. In other words, only those paging occasions (or portions thereof) are used that are within the UE's coverage windows.
2. If the paging windows for different UEs need to be evenly spread across the timeline, the instances can remain proportional to the in-coverage duration after discarding the out-of-coverage duration.
3. UE IDs of the same satellite serving area may share the same coverage windows (resulting from movement of the satellite). When the System Frame Numbers (i.e. SFN) are counted continuously within the coverage windows only, the resulting paging windows for each UE will also be within their respective coverage windows.

It is assumed that a cell's operation time (with 10 ms granularity) is made available to the UE 3 and the network. In this case the term operation time refers to the total time (in a 24-hour period) during which a particular UE can be served by that cell. It will be appreciated that the operation time may be location specific, although a common operation time value may be applied if appropriate.

Based on the applicable operation time, the actual System Frame Numbers and Hyper System Frame Numbers available to a particular UE 3 are denoted by SFN and H-SFN, respectively, using the following approach:

SFN and H-SFN only count in coverage duration/cell operation time, which stops incrementing if it is (partially) out of a coverage window, and resumes incrementing continuously at the next coverage window;

SFN will wrap around every 1024;

Upon SFN wrap around, H-SFN will increment by one; and

H-SFN wrap around when H-SFN wrap around.

The network calculates the values of SFN and H-SFN (alternatively, the values of deltaSFN=SFN−SFN and deltaH-SFN=H-SFN−HSFN) and broadcast these values to the UE 3 in system information. If the UE 3 can obtain information regarding the cell's operation time, then the UE 3 may be to derive the values of SFN and H-SFN on its own.

Beneficially, the UE 3 can derive the applicable values of PH, PTW_start, and PTW_end using the same formulas but using SFN instead of SFN, and using H-SFN instead of H-SFN.

Thus, in this system, the UE's PH is the H-SFN satisfying the following equation:

$$H\text{-}SFN \bmod T_{eDRX,H} = (\text{UE\_ID\_H} \bmod T_{eDRX,H})$$

where UE_ID_H is the identifier associated with the UE 3 (10 or 12 most significant bits) and $T_{eDRX,H}$ is the eDRX cycle of the UE 3 given in a number of Hyper-frames ($T_{eDRX,H}$=1, 2, . . . , 256 Hyper-frames).

The parameter PTW_start denotes the first radio frame of the PH that is part of the PTW and has SFN satisfying the following equation:

$$SFN = 256^{*} i_{eDRX} \text{ where}$$

$$i_{eDRX} = \text{floor}(\text{UE\_ID\_H}/T_{eDRX,H}) \bmod 4$$

The parameter PTW_end indicates the last radio frame of the PTW within the coverage window and has SFN satisfying the following equation:

$$SFN = (\text{PTW\_start} + L * 100 - 1) \bmod 1024$$

where L=Paging Time Window length (in seconds) configured by upper layers.

It will be appreciated that the UE 3 (and the base station 6) may be configured to switch between the formulas using SFN and the formulas using SFN depending on whether the UE 3 is served by an NTN cell and/or depending on availability of information on the cell's operation time. For example, the UE 3 may be configured to initially determine its PTW based on the formulas using SFN and switch to the formulas using SFN when it goes out-of-coverage (for the first time).

Beneficially, when deriving the applicable PTW based on SFN instead of SFN, the network can avoid paging the UE 3, and the UE 3 does no need to monitor for paging messages, during the period(s) when the UE 3 is out-of-coverage (or the UE's cell is non-operational).

<Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). The term base station may refer to any of the following nodes defined in 3GPP Technical Specifications 38.300 (V16.6.0) and 37.340 (V16.6.0):

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

It will be appreciated that the above embodiments may be applied to both 5G New Radio and LTE systems (E-UTRAN). A base station (gateway) that supports E-UTRA/4G protocols may be referred to as an 'eNB' and a base station that supports NextGeneration/5G protocols may be referred to as a 'gNBs'. It will be appreciated that some base stations may be configured to support both 4G and 5G protocols, and/or any other 3GPP or non-3GPP communication protocols.

TABLE 1 types of satellites and UAS platforms

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Figure 12:
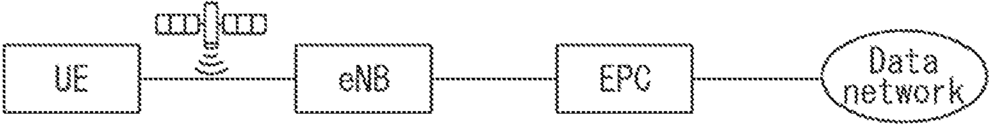
FIG. 12 illustrates schematically some exemplary architecture options for the provision of NTN features in the system shown in FIG. 1.
Figure 12:
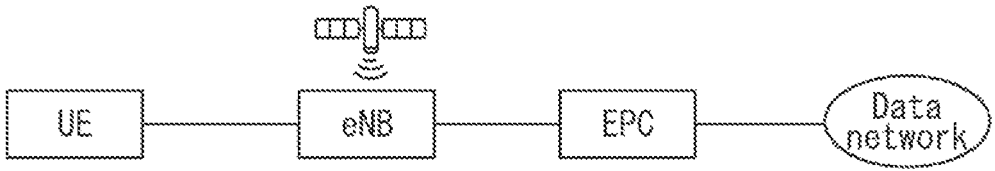
Figure 12:
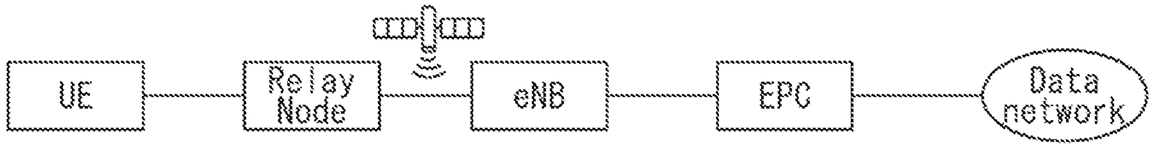
Figure 12:
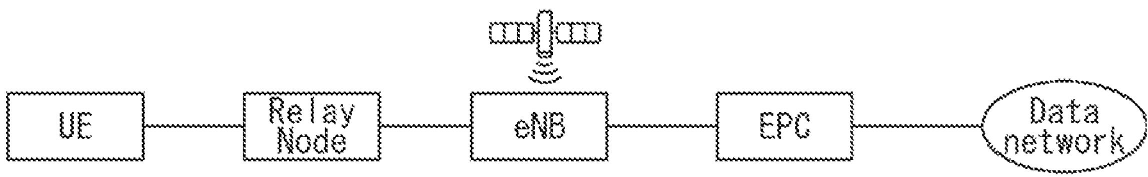

It will be appreciated that there are various architecture options to implement NTN in a 4G system, some of which are illustrated schematically in FIG. 12. The first option shown is an NTN featuring an access network serving UEs and based on a satellite/aerial with bent pipe payload and eNB on the ground (satellite hub or gateway level). The second option is an NTN featuring an access network serving UEs and based on a satellite/aerial with eNB on board. The third option is an NTN featuring an access network serving Relay Nodes and based on a satellite/aerial with bent pipe payload. The fourth option is an NTN featuring an access network serving Relay Nodes and based on a satellite/aerial with eNB. It will be appreciated that other architecture options may also be used, for example, a combination of two or more of the above-described options. Alternatively, the relay node may comprise a satellite/UAS. It will be appreciated that similar architecture options may be used in a 5G/NR system as well, but with gNB instead of eNB, and NGC instead of EPC.

In the above description, the UE, the NTN node (satellite/UAS platform), and the access network node (base station) are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the NTN node, and the access network node (base station) as a signal over a computer network, or on a recording medium. Further, the functionality performed by part or all of this software may be performed using one or more dedicated hardware circuits. However, the use of software modules is preferred as it facilitates the updating of the UE, the NTN node, and the access network node (base station) in order to update their functionalities.

The above embodiments are also applicable to 'non-mobile' or generally stationary user equipment.

The method performed by the UE may further comprise suspending said timer upon the UE moving out of coverage whilst the timer is running.

The method performed by the UE may further comprise restarting the suspended timer upon the UE moving in coverage and entering the RRC idle mode.

The method performed by the UE may further comprise activating said power saving mode upon expiry of the timer.

The method performed by the UE may further comprise deactivating said power saving mode upon the UE moving in coverage. For example, the UE may deactivate the power saving mode upon moving in coverage and in a case that the UE needs to initiate a mobile originated data transmission or signalling (such as Tracking Area Update).

The method performed by the UE may further comprise entering an RRC connected mode and initiating a data transmission when the UE has data to send after deactivating the power saving mode. In this case, the method may further comprise delaying said transmission after moving in coverage (e.g. based on an associated backoff value). The transmission may comprise a Tracking Area Update (TAU).

The method performed by the UE may further comprise determining whether the UE is in coverage or out of coverage based on at least one of: information relating to a node of the non-terrestrial network (e.g. ephemeris information for a satellite); information relating to a location of the UE (e.g. Global Navigation Satellite System (GNSS) signalling); and monitoring of radio signals.

The method performed by the UE may further comprise receiving the information identifying a paging transmission window using at least one information element in a Non-Access Stratum (NAS) message (e.g. an 'Attach Accept' message, a 'TAU Accepted' message, or a 'Paging' message). The information identifying a paging transmission window may identify at least one of: a starting point of the paging transmission window; a PTW offset; and a pair of Hyper System Frame Number (H-SFN) and System Frame Number (SFN) values.

The method performed by the UE may comprise transmitting said assistance information using at least one information element (e.g. using Tracking Area Update (TAU) and/or Non-Access Stratum (NAS) signalling). The assistance information may identify at least one of: a recommended or preferred PTW start point (e.g. H-SFN, SFN pair); a recommended or preferred PTW length; an in-coverage time prediction, a current or predicted UE position.

The method performed by the UE may comprise transmitting the assistance information to the network node in a case that a current PTW of the UE does not match its in-coverage window and/or in a case that a position of the UE has changed (e.g. above an associated threshold or a distance from a reference point).

The method performed by the UE may comprise entering a Radio Resource Control (RRC) connected mode, upon expiry of the backoff timer, for initiating the data transmission. The method performed by the UE may comprise receiving the information for determining a value for a backoff timer via broadcast or via dedicated signalling. The information for determining a value for a backoff timer may identify one of: a specific value for the backoff timer; and a maximum backoff timer value for use in selecting a random value for the backoff timer.

Various other modifications will be apparent to those skilled in the art and will not be described in further detail here.

LIST OF REFERENCES

[1] 3GPP Technical Report (TR) 36.763 V17.0.0
[2] 3GPP TR 38.811 V15.4.0
[3] 3GPP TR 38.821 V16.1.0
[4] 3GPP Technical Specifications (TS) 38.300 (V16.6.0)
[5] 3GPP TS 37.340 (V16.6.0):

Although the present invention has been described with reference to the exemplary embodiments, the present invention is not limited to the above. Various changes that can be understood by those skilled in the art can be made to the configuration and details of the present invention within the scope of the invention.

The program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

For example, the whole or part of the exemplary embodiments disclosed above can be described as, but not limited to, the following supplementary notes.

(Supplementary Note 1)

A method of a user equipment (UE) for communicating via a non-terrestrial network, the method comprising:

determining whether the UE is in coverage of the non-terrestrial network or out-of-coverage of the non-terrestrial network; and initiating a procedure for power saving of the UE, based on the determining.

(Supplementary Note 2)

The method according to supplementary note 1, further comprising:

receiving satellite information in a system information block, wherein the determining is based on the satellite information.

(Supplementary Note 3)

The method according to supplementary note 1 or 2, wherein the procedure for power saving is a procedure for entering a power saving mode of the UE.

(Supplementary Note 4)

The method according to supplementary note 3, further comprising maintaining the power saving mode until the UE become in coverage of the non-terrestrial network.

(Supplementary Note 5) The method according to supplementary note 4, further comprising:

estimating a next coverage window for the non-terrestrial network based on information transmitted from the non-terrestrial network.

(Supplementary Note 6)

The method according to any one of supplementary notes 3 to 5, further comprising:

receiving information for identifying a value for a timer associated with the power saving mode;

entering a Radio Resource Control (RRC) idle mode; and starting the timer upon entering the RRC idle mode, wherein the entering the power saving mode is performed:

upon the UE moving out of coverage of the non-terrestrial network whilst the timer is running based on the value; or upon expiry of the timer in accordance with the value, in a case that the UE remains in coverage of the non-terrestrial network whilst the timer is running based on the value.

(Supplementary Note 7)

The method according to supplementary note 6, further comprising suspending the timer upon the UE moving out of coverage of the non-terrestrial network whilst the timer is running based on the value.

(Supplementary Note 8)

The method according to supplementary note 7, further comprising restarting the timer upon the UE moving in coverage of the non-terrestrial network and entering the RRC idle mode.

(Supplementary Note 9)

The method according to any of supplementary notes 3 to 8, further comprising deactivating the power saving mode upon the UE moving in coverage.

(Supplementary Note 10)

The method according to supplementary note 9, further comprising entering an RRC connected mode for initiating a data transmission in a case where the UE has data to send after deactivating the power saving mode.

(Supplementary Note 11)

The method according to supplementary note 10, further comprising delaying the data transmission after moving in coverage.

(Supplementary Note 12)

The method according to any of supplementary notes 1 to 11, wherein the determining is performed based on at least one of:

information relating to a node of the non-terrestrial network;

information relating to a location of the UE; and monitoring of a radio signal.

(Supplementary Note 13)

The method according to supplementary note 1 or 2, wherein the procedure for power saving is a procedure for discarding at least one paging occasion outside a duration when the UE is in coverage.

(Supplementary Note 14)

The method according to supplementary note 13, wherein the discarding is performed so that respective paging windows for UEs can remain proportional to respective coverage windows of the respective UEs.

(Supplementary Note 15)

The method according to supplementary note 13 or 14, further comprising:

performing enhanced Discontinuous Reception (eDRX) operation based on a paging transmission window (PTW), wherein the PTW is determined by stopping incrementing at least one of Hyper System Frame Number (H-SFN) and System Frame Number (SFN) in a case where it is out of a coverage window of the UE.

(Supplementary Note 16)

The method according to supplementary note 15, further comprising:

receiving information identifying the PTW position associated with the UE for the eDRX operation; and performing the eDRX operation based on the information.

(Supplementary Note 17)

The method according to supplementary note 16, wherein information is included in at least one information element in a Non-Access Stratum (NAS) message.

(Supplementary Note 18)

The method according to supplementary note 16 or 17, wherein the information identifies at least one of:

a starting point of the PTW;

a PTW offset; and a pair of Hyper System Frame Number (H-SFN) and System Frame Number (SFN) values.

(Supplementary Note 19)

The method according to supplementary note 1 or 2, wherein the procedure for power saving is a procedure for transmitting, to a network node, assistance information for use in configuring a paging transmission window (PTW) for the UE for an enhanced Discontinuous Reception (eDRX) operation.

(Supplementary Note 20)

The method according to supplementary note 19, wherein the assistance information is included in at least one information element.

(Supplementary Note 21)

The method according to supplementary note 19 or 20, wherein the assistance information identifies at least one of:

a recommended or preferred PTW start point for the PTW;

a recommended or preferred PTW length;

an in-coverage time prediction; and a current or predicted UE position.

(Supplementary Note 22)

The method according to any of supplementary notes 19 to 21, wherein the transmitting is performed in a case that a current PTW of the UE does not match its in-coverage window and/or in a case that a position of the UE has changed.

(Supplementary Note 23)

The method according to supplementary note 1 or 2, wherein the procedure for power saving is a procedure for starting a backoff timer transmitted from the non-terrestrial network, upon entering a coverage of the non-terrestrial network, and the method further comprises:

initiating a data transmission upon expiry of the backoff timer.

(Supplementary Note 24)

The method according to supplementary note 23, further comprising entering a Radio Resource Control (RRC) connected mode, upon expiry of the backoff timer, for initiating the data transmission.

(Supplementary Note 25)

The method according to supplementary note 23 or 24, further comprising receiving information which identifies one of:

a specific value for the backoff timer; and a maximum backoff timer value for use in selecting a random value for the backoff timer.

(Supplementary Note 26)

The method according to supplementary note 24, wherein the information is transmitted via broadcast or via dedicated signalling.

(Supplementary Note 27)

A method of a network node for communicating to a user equipment (UE) via a non-terrestrial network, the method comprising:

transmitting to the UE, information for controlling power saving based on determining whether the UE is in coverage or out of coverage based on the value, such that the UE initiates a procedure for the power saving of the UE based on the determining.

(Supplementary Note 28)

The method according to supplementary note 27, wherein the information includes a value for timer, the procedure for power saving is a procedure for entering a power saving mode of the UE, and the entering the power saving mode is performed:

upon the UE moving out of coverage of the non-terrestrial network whilst the timer is running based on the value; or upon expiry of the timer in accordance with the value, in a case that the UE remains in coverage of the non-terrestrial network whilst the timer is running based on the value.

(Supplementary Note 29)

The method according to supplementary note 27, wherein the procedure for power saving is a procedure for discarding at least one paging occasion outside a duration when the UE is in coverage, the information includes information indicating a paging transmission window (PTW) position associated with the UE for an enhanced Discontinuous Reception (eDRX) operation, wherein at least one of Hyper System Frame Number (H-SFN) and System Frame Number (SFN) which is out of a coverage window of the UE is skipped for the PTW position, and the method further comprises:

performing the eDRX operation based on the information indicating the PTW position.

(Supplementary Note 30)

The method according to supplementary note 27, wherein the procedure for power saving is a procedure for discarding at least one paging occasion outside a duration when the UE is in coverage, the information includes information indicating a paging transmission window (PTW) position associated with the UE for an enhanced Discontinuous Reception (eDRX) operation, wherein at least one of Hyper System Frame Number (H-SFN) and System Frame Number (SFN) which is out of a coverage window of the UE is skipped for the PTW position, and the method further comprising:

receiving the information indicating the PTW position, in a paging message; and paging the UE based on the information indicating the PTW position.

(Supplementary Note 31)

The method according to supplementary note 27, wherein the procedure for power saving is a procedure for starting a backoff timer transmitted from the non-terrestrial network, upon entering a coverage of the non-terrestrial network, and the expiry of the backoff timer causes the UE to initiate a data transmission.

(Supplementary Note 32)

A user equipment (UE) for communicating via a non-terrestrial network, the method comprising:

means for determining whether the UE is in coverage of the non-terrestrial network or out-of-coverage of the non-terrestrial network; and means for initiating a procedure for power saving of the UE, based on the determining.

(Supplementary Note 33)

The UE according to supplementary note 32, wherein the procedure for power saving is a procedure for entering a power saving mode of the UE, and the UE further comprises:

means for receiving information for identifying a value for a timer associated with the power saving mode;

means for entering a Radio Resource Control (RRC) idle mode; and means for starting the timer upon entering the RRC idle mode, wherein the entering the power saving mode is performed:

upon the UE moving out of coverage of the non-terrestrial network whilst the timer is running based on the value; or upon expiry of the timer in accordance with the value, in a case that the UE remains in coverage of the non-terrestrial network whilst the timer is running based on the value.

(Supplementary Note 34)

The user equipment (UE) according to supplementary note 32, wherein the procedure for power saving is a procedure for discarding at least one paging occasion outside a duration when the UE is in coverage, and the UE further comprises:

means for receiving information identifying a paging transmission window (PTW) position associated with the UE for an enhanced Discontinuous Reception (eDRX) operation, wherein the PTW is determined by stopping incrementing at least one of Hyper System Frame Number (H-SFN) and System Frame Number (SFN) in a case where it is out of a coverage window of the UE; and means for performing the eDRX operation based on the information.

(Supplementary Note 35)

The UE according to supplementary note 32, wherein the procedure for power saving is a procedure for transmitting, to a network node, assistance information for use in configuring a paging transmission window (PTW) for the UE for an enhanced Discontinuous Reception (eDRX) operation.

(Supplementary Note 36)

The UE according to supplementary note 32, wherein the procedure for power saving is a procedure for starting a backoff timer transmitted from the non-terrestrial network, upon entering a coverage of the non-terrestrial network; and the UE further comprises means for initiating a data transmission upon expiry of the backoff timer.

(Supplementary Note 37)

A network node for communicating to a user equipment (UE) via a non-terrestrial network, the network node comprising:

means for transmitting to the UE, information for controlling power saving based on determining whether the UE is in coverage or out of coverage based on the value, such that the UE initiates a procedure for the power saving of the UE based on the determining.

(Supplementary Note 38)

The network node according to supplementary note 37, wherein the information includes a value for timer, the procedure for power saving is a procedure for entering a power saving mode of the UE, and the entering the power saving mode is performed:

upon the UE moving out of coverage of the non-terrestrial network whilst the timer is running based on the value; or upon expiry of the timer in accordance with the value, in a case that the UE remains in coverage of the non-terrestrial network whilst the timer is running based on the value.

(Supplementary Note 39)

The network node according to supplementary note 37, wherein the procedure for power saving is a procedure for discarding at least one paging occasion outside a duration when the UE is in coverage, the information includes information indicating a paging transmission window (PTW) position associated with the UE for an enhanced Discontinuous Reception (eDRX) operation, wherein at least one of Hyper System Frame Number (H-SFN) and System Frame Number (SFN) which is out of a coverage window of the UE is skipped for the PTW position, and the network node further comprises:

means for performing the eDRX operation based on the information indicating the PTW position.

(Supplementary Note 40)

The network node according to supplementary note 37, wherein the procedure for power saving is a procedure for discarding at least one paging occasion outside a duration when the UE is in coverage, the information includes information indicating a paging transmission window (PTW) position associated with the UE for an enhanced Discontinuous Reception (eDRX) operation, wherein at least one of Hyper System Frame Number (H-SFN) and System Frame Number (SFN) which is out of a coverage window of the UE is skipped for the PTW position, and the network node further comprising:

means for receiving the information indicating the PTW position, in a paging message; and means for paging the UE based on the information indicating the PTW position.

(Supplementary Note 41)

The network node according to supplementary note 37, wherein the procedure for power saving is a procedure for starting a backoff timer transmitted from the non-terrestrial network, upon entering a coverage of the non-terrestrial network, and expiry of the backoff timer causes the UE to initiate a data transmission.

This application is based upon and claims the benefit of priority from United Kingdom patent application No. 2111281.8, filed on Aug. 4, 2021, the disclosure of which is incorporated herein in its entirety by reference.

REFERENCE SIGNS LIST

1 communication system
3 user equipment (UE)
5 satellite
6 gateway
7 data network

What is claimed is:

1. A method of a user equipment (UE) for communicating via a non-terrestrial network, the method comprising:

receiving satellite information in a system information block;

predicting whether the UE is in coverage of the non-terrestrial network or out-of-coverage of the non-terrestrial network based on the satellite information; and entering a power saving mode of the UE, even while a first timer that starts when the UE enters an idle mode and controls how long the UE needs to remain in the idle mode is running, in a case where the predicting is performed by predicting that the UE is out-of-coverage of the non-terrestrial network.

2. The method according to claim 1, further comprising:

ending the power saving mode of the UE in a case where the predicting is performed by predicting that the UE is in-coverage of the non-terrestrial network.

3. The method according to claim 2, further comprising:

transmitting uplink data after expiration of a back off timer which is activated after the ending the power saving mode of the UE.

4. The method according to claim 1, further comprising:

starting the first timer indicating an active time for the UE;

suspending the first timer upon the UE moving out-of-coverage of the non-terrestrial network; and resuming the first timer upon the UE moving in-coverage of the non-terrestrial network.

5. The method according to claim 4, further comprising:

maintaining the power saving mode of the UE in a case where the first timer is started, and the predicting is performed by predicting that the UE is out-of-coverage of the non-terrestrial network.

6. The method according to claim 1, wherein maintaining the power saving mode of the UE in a case where the UE has uplink data to transmit and the predicting is performed by predicting that the UE is out-of-coverage of the non-terrestrial network.

7. A method of a network node for communicating to a user equipment (UE) via a non-terrestrial network, the method comprising:

transmitting to the UE, satellite information in a system information block, for controlling a power saving mode of the UE based on predicting whether the UE is in coverage or out of coverage based on the satellite information, such that the UE enters the power saving mode of the UE based on the predicting, even while a first timer that starts when the UE enters an idle mode and controls how long the UE needs to remain in the idle mode is running.

8. A user equipment (UE) for communicating via a non-terrestrial network, the UE comprising:

at least one memory storing instructions; and at least one processor configured to process the instructions to:

receive satellite information in a system information block;

predict whether the UE is in coverage of the non-terrestrial network or out-of-coverage of the non-terrestrial network based on the satellite information; and enter a power saving mode of the UE, even while a first timer that starts when the UE enters an idle mode and controls how long the UE needs to remain in the idle mode is running, in a case where the predicting is performed by predicting that the UE is out-of-coverage of the non-terrestrial network.

9. A network node for communicating to a user equipment (UE) via a non-terrestrial network, the network node comprising:

at least one memory storing instructions; and at least one processor configured to process the instructions to:

transmit to the UE, satellite information in a system information block, for controlling a power saving mode of the UE, even while a first timer, that starts when the UE enters an idle mode and controls how long the UE needs to remain in the idle mode, is running, based on predicting whether the UE is in coverage or out of coverage based on the satellite information, such that the UE enters the power saving mode of the UE based on the predicting.

* * * * *